US008312638B2

(12) United States Patent
Park et al.

(10) Patent No.: US 8,312,638 B2
(45) Date of Patent: Nov. 20, 2012

(54) MULTIPLE LAUNDRY TREATING MACHINE

(75) Inventors: Seong Ho Park, Changwon-si (KR); Phal Jin Lee, Changwon-si (KR); Seong Hae Jeong, Changwon-si (KR); Seong Jin Jo, Changwon-si (KR)

(73) Assignee: LG Electronics Inc., Seoul (KR)

( * ) Notice: Subject to any disclaimer, the term of this patent is extended or adjusted under 35 U.S.C. 154(b) by 132 days.

(21) Appl. No.: 12/310,365

(22) PCT Filed: Aug. 20, 2007

(86) PCT No.: PCT/KR2007/003966
§ 371 (c)(1),
(2), (4) Date: Feb. 23, 2009

(87) PCT Pub. No.: WO2008/023909
PCT Pub. Date: Feb. 28, 2008

(65) Prior Publication Data
US 2010/0011609 A1 Jan. 21, 2010

(30) Foreign Application Priority Data

Aug. 23, 2006 (KR) .................. 10-2006-0079895
Dec. 27, 2006 (KR) .................. 10-2006-0135130

(51) Int. Cl.
*F26B 19/00* (2006.01)
*F26B 25/06* (2006.01)
(52) U.S. Cl. .......... 34/60; 34/88; 34/90; 34/209; 34/210
(58) Field of Classification Search .............. 34/88, 209, 34/210, 218, 60, 90
See application file for complete search history.

(56) References Cited

U.S. PATENT DOCUMENTS

| 3,402,477 A |   | 9/1968 | Hubbard |
|---|---|---|---|
| 3,555,701 A | * | 1/1971 | Hubbard .................. 34/602 |
| 4,447,705 A | * | 5/1984 | Bullock .................. 219/222 |

(Continued)

FOREIGN PATENT DOCUMENTS

CN 1637785 7/2005
(Continued)

*Primary Examiner* — Jiping Lu
(74) *Attorney, Agent, or Firm* — McKenna Long & Aldridge LLP

(57) ABSTRACT

A multiple laundry treating machine, in which an auxiliary laundry treating device (120) is coupled to a general laundry treating device (110), is disclosed. The multiple laundry treating machine includes a main laundry treating device (110) for washing or drying laundry contained in an interior of the main laundry treating device (110), an auxiliary laundry treating device (120) arranged at one side of the main laundry treating device (110), the auxiliary laundry treating device (120) having a volume and a height respectively smaller than a volume and a height of the main laundry treating device (110), and having a laundry container (121) formed in an interior of the auxiliary laundry treating device (120), and a connecting unit (300) for connecting the main and auxiliary laundry treating devices (110, 120), to enable communication or control operations between the main and auxiliary laundry treating devices (110, 120). In accordance with the multiple laundry treating machine, it is possible to achieve a convenience in use and to save energy because a small amount of clothes or shoes can be dried by the auxiliary laundry treating device (120), without driving a laundry treating device (120) having a relatively-large capacity.

13 Claims, 9 Drawing Sheets

U.S. PATENT DOCUMENTS

| | | | |
|---|---|---|---|
| 4,663,948 A | 5/1987 | Rummel | |
| 4,819,341 A * | 4/1989 | Gayso | 34/86 |
| 7,093,374 B2 * | 8/2006 | Yang et al. | 34/60 |
| 2006/0010934 A1 * | 1/2006 | Kim | 68/3 R |
| 2006/0090524 A1 | 5/2006 | Jeon et al. | |
| 2006/0150689 A1 | 7/2006 | Kim et al. | |
| 2007/0151120 A1 * | 7/2007 | Tomasi et al. | 34/601 |

FOREIGN PATENT DOCUMENTS

| | | |
|---|---|---|
| CN | 1721713 | 1/2006 |
| EP | 0 747 523 | 12/1996 |
| EP | 1 028 188 | 8/2000 |
| EP | 1439258 A1 | 7/2004 |
| EP | 1548679 A2 | 6/2005 |
| EP | 1616991 A1 | 1/2006 |
| EP | 1 621 660 | 2/2006 |
| JP | 54108060 A2 | 8/1979 |
| JP | 04084997 A * | 3/1992 |
| KR | 20060079891 A | 7/2006 |
| SU | 242774 | 9/1969 |

* cited by examiner

[Fig. 1]
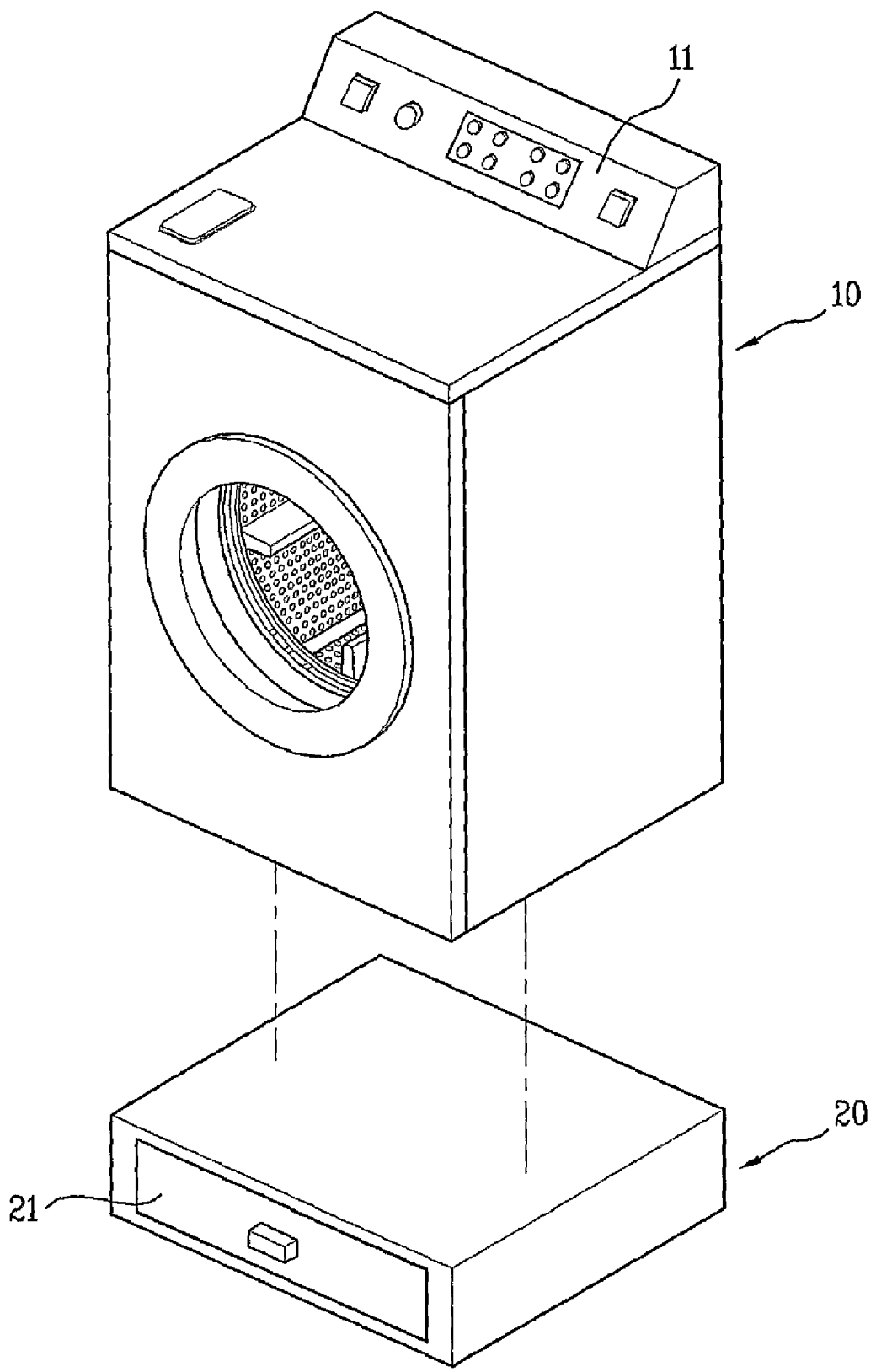

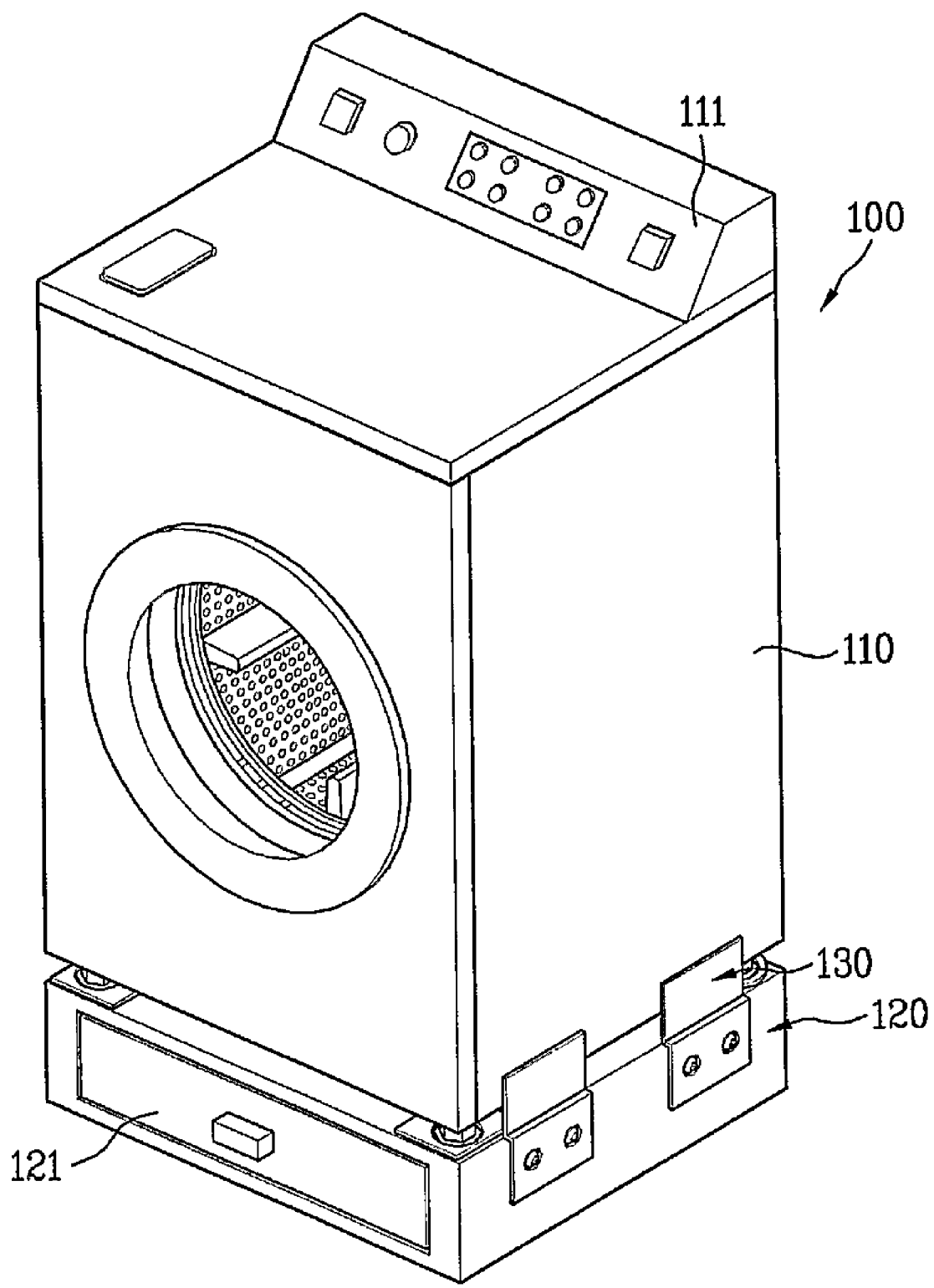
[Fig. 2]

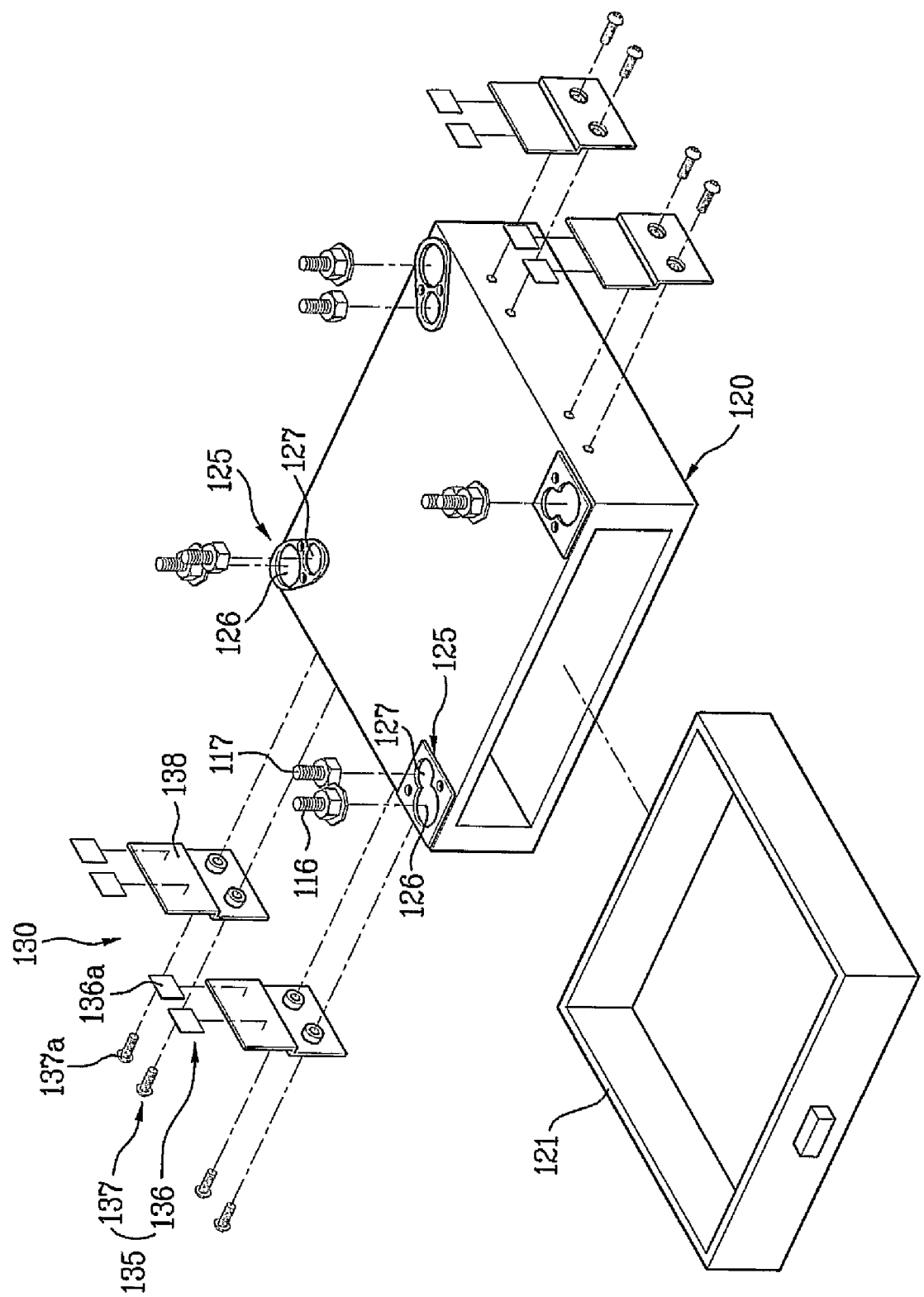
[Fig. 3]

[Fig. 4]
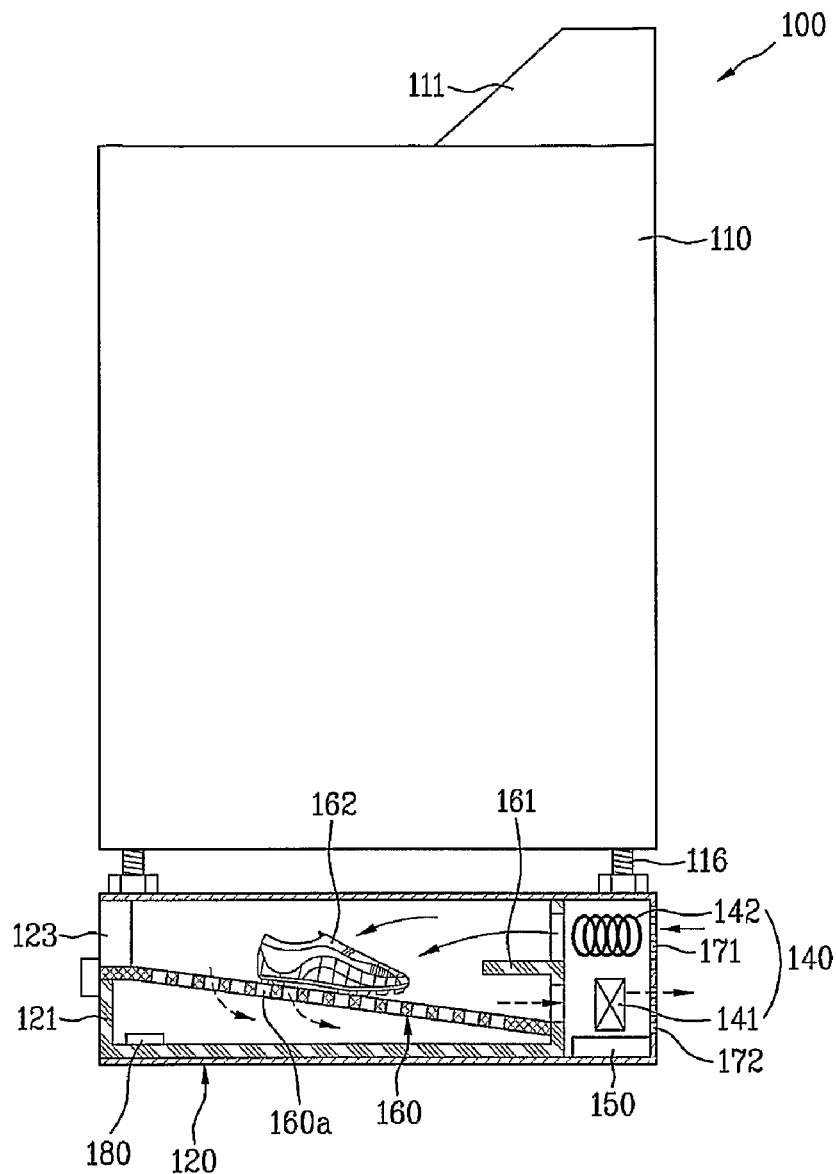
[Fig. 5]
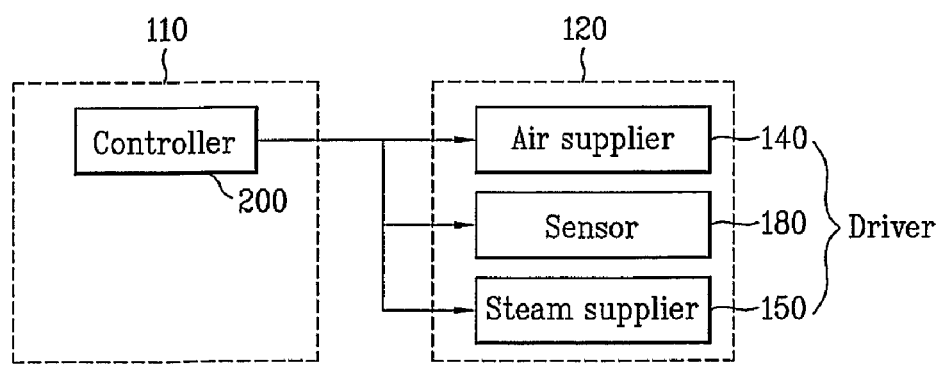

[Fig. 6]
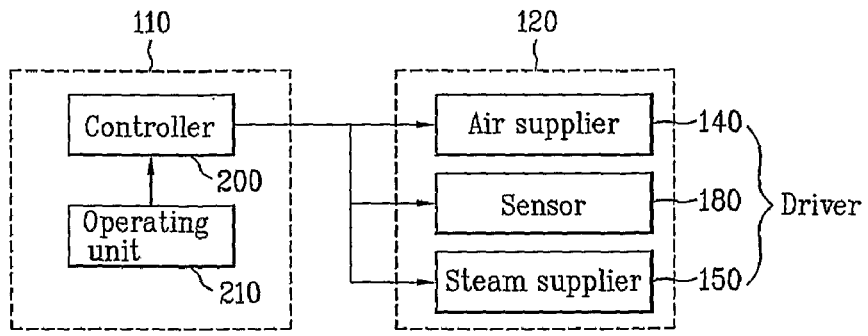
[Fig. 7]
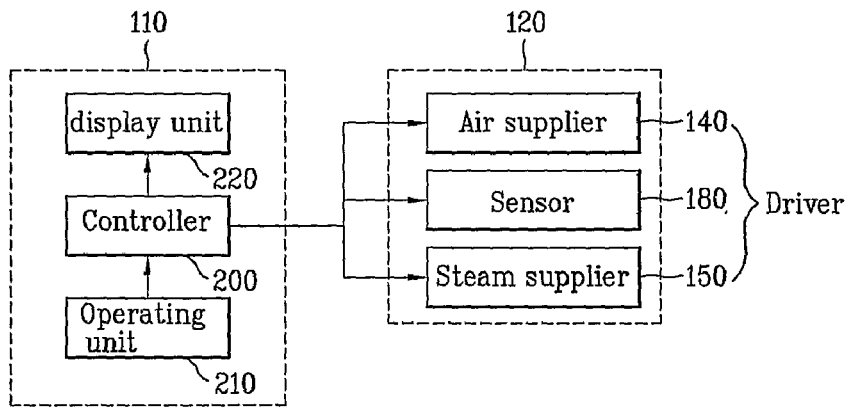
[Fig. 8]
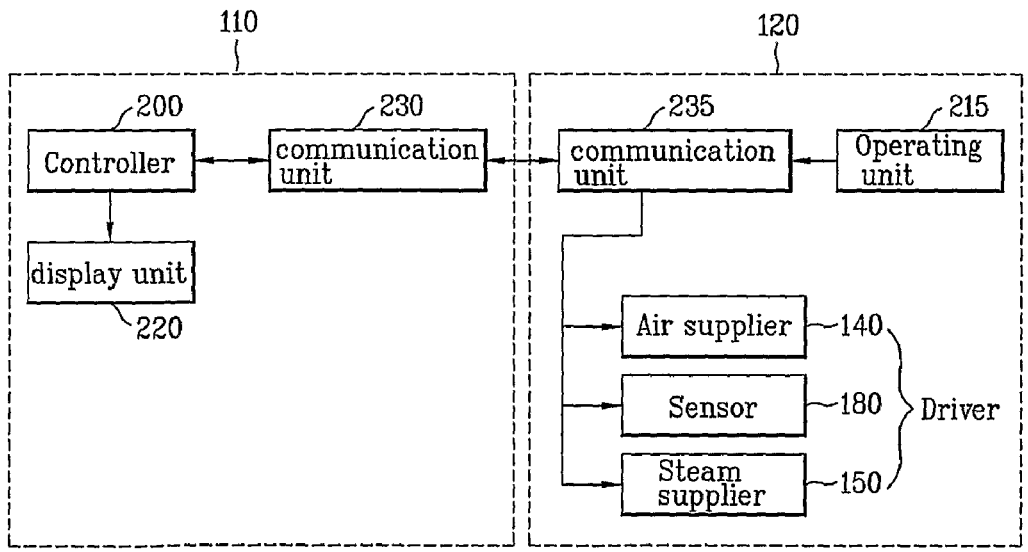

[Fig. 9]
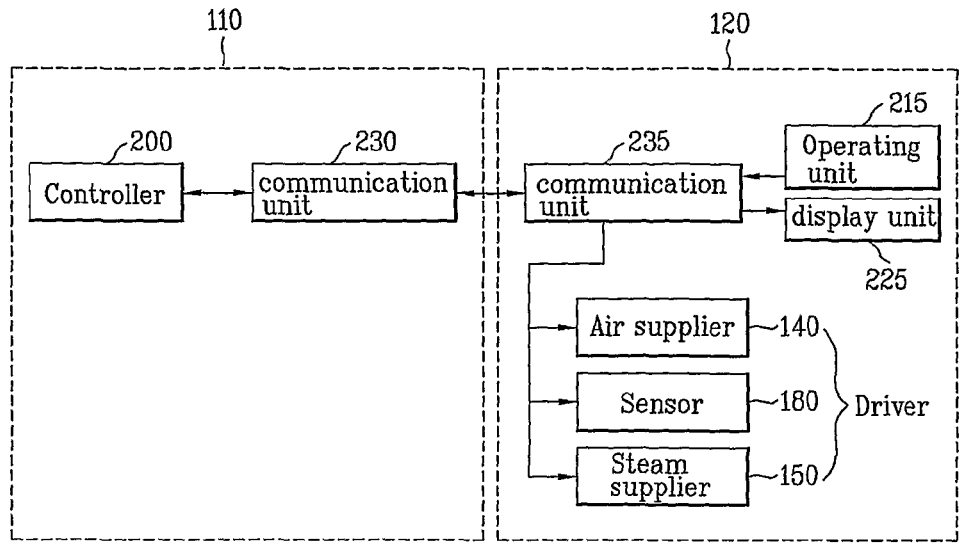
[Fig. 10]
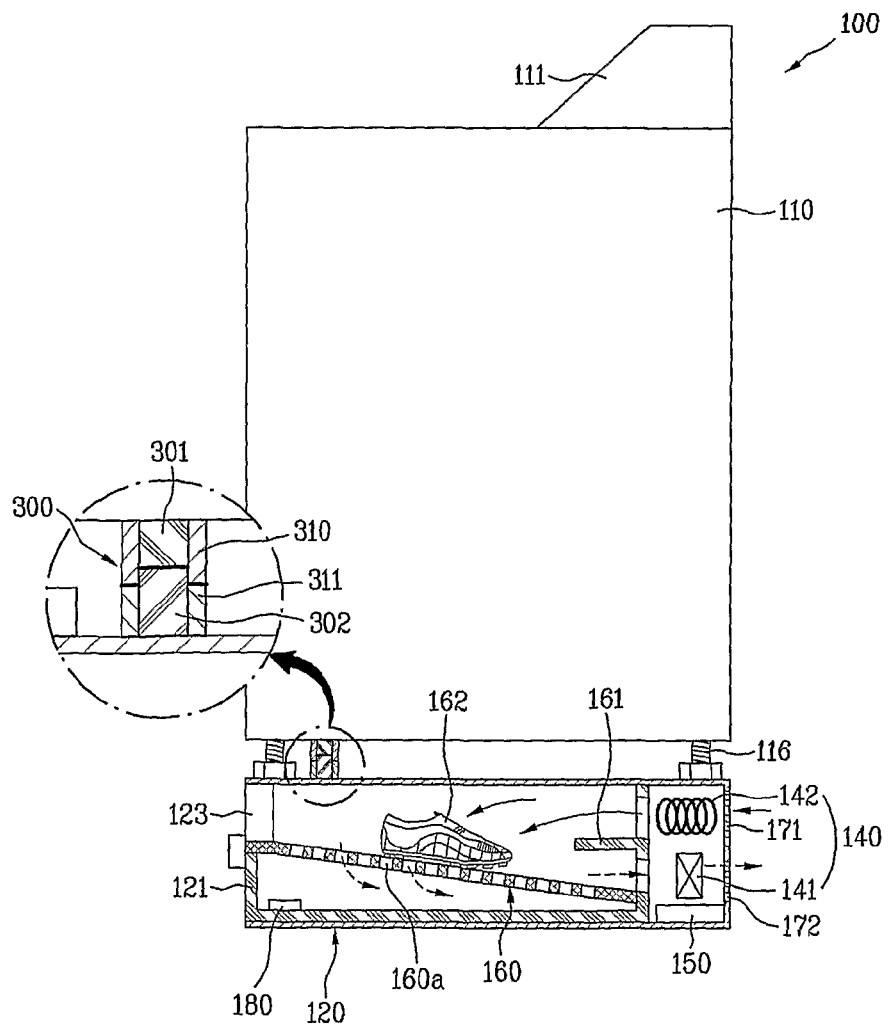

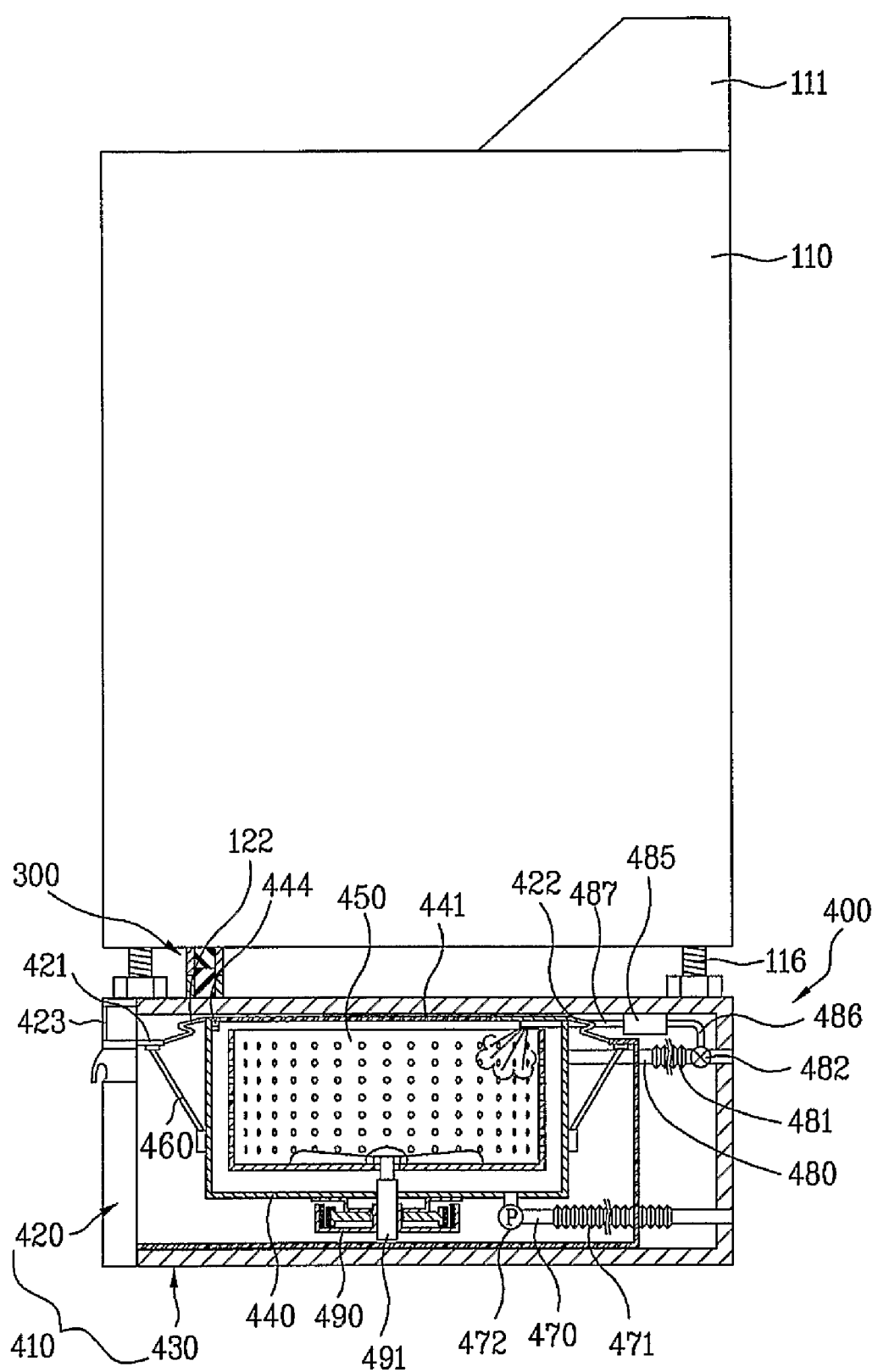
[Fig. 11]

[Fig. 12]
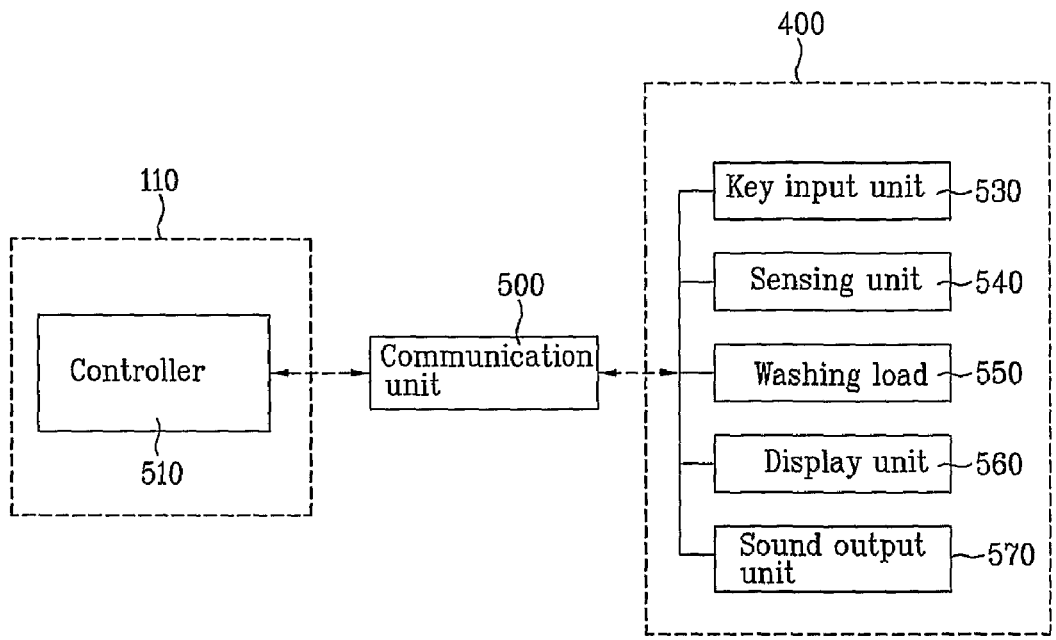
[Fig. 13]
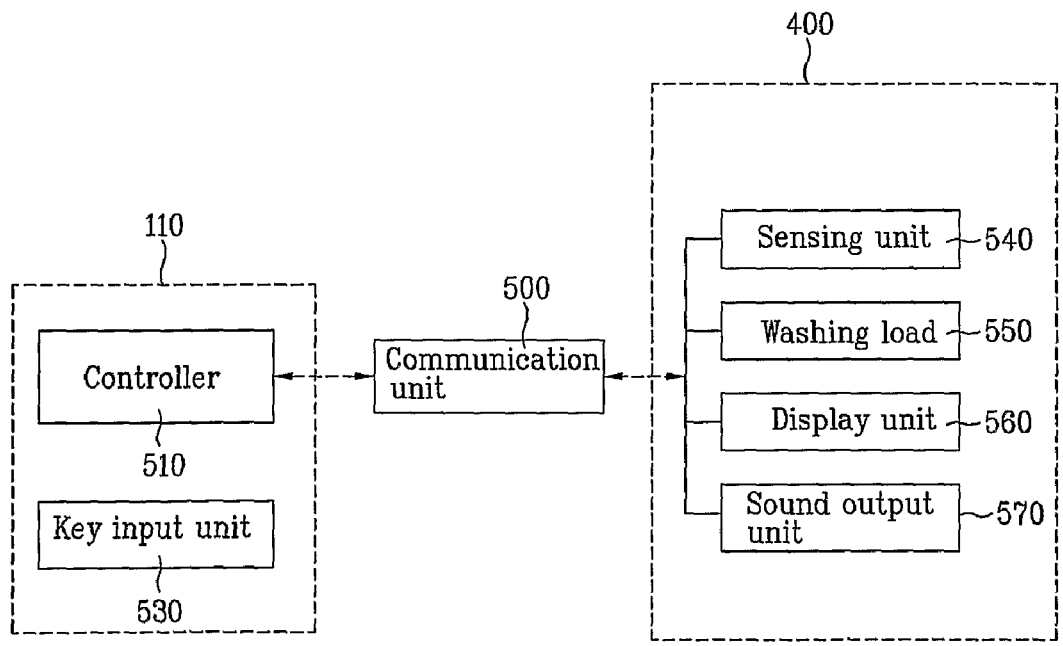

[Fig. 14]
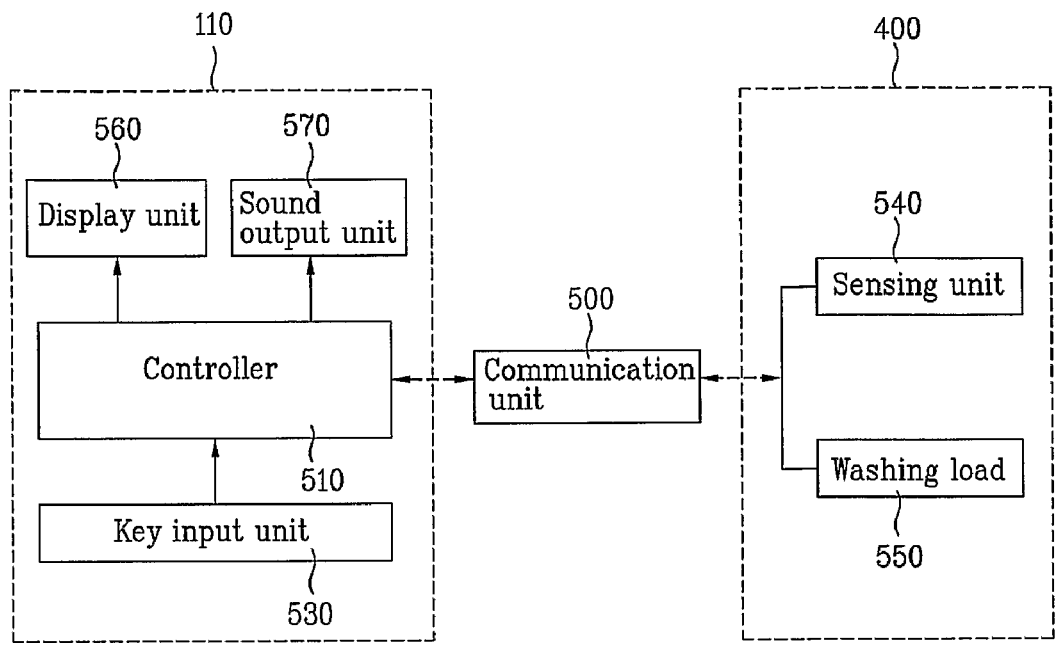

MULTIPLE LAUNDRY TREATING MACHINE

This application is a 35 USC §371 national stage entry of. International Application No. PCT/KR2007/003966, filed on Aug. 20, 2007, and claims priority to Korean Patent Application Numbers: KR-10-2006-0079895, filed Aug. 23, 2006, and KR-10-2006-0135130, filed Dec. 27, 2006, which are hereby incorporated by reference herein in its entirety.

TECHNICAL FIELD

The present invention relates to a laundry treating machine, and more particularly, to a multiple laundry treating machine configured by coupling an auxiliary laundry treating device such as an auxiliary drying device or an auxiliary washing device to a main laundry treating device.

BACKGROUND ART

Generally, a laundry treating machine means an apparatus for washing, drying, or washing and drying laundry. One laundry treating machine can perform only a washing function or a drying function or can perform both the washing and drying functions. Recently, a laundry treating machine, which includes a steam supplier, to have a refresh function for, for example, removal of creases, odor, static electricity, etc. from laundry, has been available.

A representative one of such laundry treating machines is a washing machine.

Meanwhile, conventional laundry treating machines are classified into a front loading type and a top loading type in accordance with the direction that laundry is taken cut. Also, conventional laundry treating machines are classified into a vertical-axis type, in which a pulsator or a washing tub rotates, and a horizontal-axis type, in which a drum rotates. The representative example of such a horizontal-axis type laundry treating machine is a drum washing machine or a drum drying machine.

Such laundry treating machines have a tendency to have a large size, in order to meet the recent demand of users. That is, laundry treating machines used for domestic purposes have a tendency to have a large outer size.

Meanwhile, there are conventional laundry treating machines having no drying function. In association with such a laundry treating machine, which may be a washing machine, there is a problem in that, when the user wants a drying function, it is necessary to purchase a separate drying machine or a separate washing machine having a drying function. Thus, when it is desired to obtain both the washing function and the drying function, the expenses burden on the consumer must correspondingly increase.

Where laundry treating machines having a drying unction have a large size, there may be a problem in terms of saving of energy because they are driven in a large capacity even when a small amount of laundry is dried. Meanwhile, in drum type drying machines, there is a problem in that it is difficult to dry shoes or clothes. Of course, it may be possible to dry shoes, etc. by installing a rack in a drum, to lay the shoes on the rack, and maintaining the rack in a horizontal state, irrespective of a rotation of the drum. In this case, however, there is an inconvenience because the user should frequently perform the installation and separation of the rack.

Generally, only one large-capacity washing machine is equipped in a home. When it is desired to wash different kinds of laundry in an independent manner, using the washing machine, it is necessary to operate the washing machine several times.

Also, the use of such a large-capacity washing machine in washing a small amount of laundry is undesirable in terms of saving of energy. This is because the washing course set in the large-capacity washing machine is typical for the case, in which the amount of laundry to be washed is large, so that the amount of water to be consumed in the washing course is large. As a result, the washing time and the consumption of energy increase unnecessarily.

FIG. 1 is a perspective view illustrating a conventional laundry treating machine.

As shown in FIG. 1, the conventional laundry treating machine 10 includes a body forming the outer structure of the laundry treating machine 10, and a control panel 11 arranged at the front surface or top surface of the body. The control panel 11 may include a controller for controlling the operation of the laundry treating machine 10. In accordance with this configuration, the user enables the laundry treating machine 10 to perform a laundry treating operation such as a washing operation or a drying operation by manipulating the control panel 11.

The laundry treating machine 10 may be a washing machine, a drying machine, or a washing/drying machine.

The laundry treating machine 10 may further include a pedestal 20 for supporting the laundry treating machine 10 on a floor. In this case, the laundry treating machine 10 is laid on the pedestal 20.

Generally, the pedestal 20 is defined with a certain space therein. The space has a structure including a drawer 21, which can be forwardly drawn. The pedestal 20 not only supports the laundry treating machine 10, but also functions as a storage box for storing a detergent or laundry.

In the conventional laundry treating machine, however, the pedestal 20 does not have any function for treating laundry.

DISCLOSURE OF INVENTION

Technical Problem

The present invention has been made in view of the above-mentioned problems, and an object of the present invention is to provide a combination of a laundry treating machine with an auxiliary laundry treating device capable of treating a small amount of laundry without driving the laundry treating machine, which has a relatively-large capacity, to achieve a convenience in use and to save energy.

Another object of the present invention is to provide a multiple laundry treating machine, which includes a washing machine only having a washing function, and a drying function easily addable to the washing machine.

Another object of the present invention is to provide a multiple laundry treating machine capable of easily drying laundry including shoes, hats, etc. which are difficult to be dried using a conventional drum type drying machine.

Still another object of the present invention is to utilize an auxiliary space defined in a conventional laundry treating machine, such as a pedestal, as an auxiliary drying device or an auxiliary washing device.

Technical Solution

In one aspect of the present invention, a multiple laundry treating machine comprises: a main laundry treating device for washing or drying laundry contained in an interior of the main laundry treating device; an auxiliary laundry treating device arranged at one side of the main laundry treating device, the auxiliary laundry treating device having a volume and a height respectively smaller than a volume and a height of the main laundry treating device, and having a laundry container formed in an interior of the auxiliary laundry treating device; and a connecting unit for connecting the main and auxiliary laundry treating devices, to enable communication or control operations between the main and auxiliary laundry treating devices.

The connection by the connecting unit is achieved as the main and auxiliary laundry treating devices are coupled.

The main laundry treating device may be a general washing machine. The auxiliary laundry treating device may be installed and used independently of the main laundry treating device. However, it is preferred that the auxiliary laundry treating device be coupled to one side of a body of the main laundry treating device by the coupler. This is because it is desirable to integrate laundry treating devices including the main laundry treating device and the auxiliary laundry treating device, which assists the main laundry treating device, in order to effectively carry out a series of laundry treating processes. It is also preferred that the auxiliary laundry treating device be coupled to the main laundry treating device, in terms of the utilization of space.

Of course, the main laundry treating device, which is a main component of the multiple laundry treating machine, may be a washing machine, a drying machine, or a washing/drying machine. However, the main laundry treating device is not limited to such machines. The main laundry treating device may be a spin-drying machine, which only performs a spin drying function.

Preferably, the connecting unit comprises connectors respectively provided at the main and auxiliary laundry treating devices. As the connectors are connected, lines for transmission of communication or control signals between the main and auxiliary laundry treating devices are connected. Of course, it is preferred that the lines have the form of harnesses.

Preferably, the connecting unit further comprises insulators for insulating the connectors, respectively. The insulators may enhance a stability in accordance with the insulation of the connectors. The insulators may be formed integrally with the connectors, respectively.

Of course, such an insulator may be provided at only one of the main and auxiliary laundry treating devices.

Preferably, the connection by the connecting unit, namely, the connection of the connectors, is achieved, simultaneously with the coupling of the main and auxiliary laundry treating devices. Accordingly, it is possible to eliminate a separate manual task by the user or service man to connect the connectors. Since the main and auxiliary laundry treating devices are coupled by the coupler, it is possible to secure the reliability of the connection between the connectors.

Preferably, the driver comprises an air supplier for forcibly supplying air to the laundry container. Preferably, the air supplier comprises a blowing fan for blowing air, and a heater for heating air. In this case, it is possible to perform a drying operation for laundry thrash the auxiliary laundry treating device.

Preferably, the driver comprises at least one of a temperature sensor for sensing an internal temperature of the laundry container and a humidity sensor for sensing an internal humidity of the laundry container. In this case, it is possible to more effectively achieve a desired drying operation, using the temperature sensed by the temperature sensor or the humidity sensed by the humidity sensor.

The driver may further comprise a steam supplier for supplying steam to the laundry container.

Preferably, the auxiliary laundry treating device is a pedestal for supporting the main laundry treating device on a floor. Preferably, the laundry container has a form of a drawer drawable forwardly at a front side of the body of the auxiliary laundry treating device.

Inlets may be formed at an upper portion of a rear wall of the auxiliary laundry treating device, to introduce air into the auxiliary laundry treating device. Also, outlets may be formed at a lower portion of the rear wall of the auxiliary laundry treating device, to outwardly discharge air from the auxiliary laundry treating device. Preferably, an upper rear wall portion of the drawer communicates with the inlets.

Preferably, a lower rear wall portion of the drawer communicates with the outlets.

Preferably, the air supplier and steam supplier are arranged between the rear wall of the drawer and the rear wall of the auxiliary laundry treating device.

Of course, for the installation of the above-described elements, the side walls of the auxiliary laundry treating device and drawer may be used, in place of the rear walls of the auxiliary laundry treating device and drawer. In this case, introduction and discharge of air are carried out at one lateral side of the auxiliary laundry treating device, in place of the rear side of the auxiliary laundry treating device. Since the "rear side" and "lateral side" are different from each other, only in terms of the reference direction, it may be considered that the introduction and discharge of air at one lateral side of the auxiliary laundry treating device include the introduction and discharge of air at the rear side of the auxiliary laundry treating device.

The auxiliary laundry treating device may further comprise a rack, on which laundry is laid. Preferably, the rack is arranged in the drawer such that the interior of the laundry container is partitioned into upper and lower spaces by the rack. The upper and lower spaces communicate with each other through the rack. The rack may be inclinedly arranged. It is preferred that the rack be downwardly inclined toward a position where air is introduced.

Preferably, an air guide is provided at the upper rear wall portion of the drawer such that air guide extends into the interior of the drawer. The air guide not only uniformly supplies air over the upper portion of the drawer, but also minimizes the interference between the introduction air and discharge air.

The main laundry treating device may include an operating unit for operating the auxiliary laundry treating device in accordance with a user's selection. That is, the operating unit, which operates the auxiliary laundry treating device, may be provided at the main laundry treating device, in place of the auxiliary laundry treating device. The main laundry treating device may include a display unit for displaying an operation state of the auxiliary laundry treating device. That is, the display unit, which displays an operation state of the auxiliary laundry treating device, may be provided at the main laundry treating device, in place of the auxiliary laundry treating device. Accordingly, the user can operate the auxiliary laundry treating device through the operating unit provided at the main laundry treating device, and can check the operation state of the auxiliary laundry treating device through the display unit provided at the main laundry treating device. In other words, the main laundry treating device may include the operating unit for operating the auxiliary laundry treating device, separate from the operating unit for operating the main laundry treating device. Also, the main laundry treating device may include the display unit for displaying the operation state of the auxiliary laundry treating device, separately from the display unit for displaying the operation state of the main laundry treating device. Of course, it may be possible to display the operation states of the main and auxiliary laundry treating devices, thrash a single display unit.

The auxiliary laundry treating device may include an operating unit for operating the auxiliary laundry treating device in accordance with a user's selection. The auxiliary laundry treating device may also include a display unit for displaying an operation state of the auxiliary laundry treating device.

The main and auxiliary laundry treating devices may include communication units for wired or wireless communications between the main and auxiliary laundry treating devices. Through the communication units, it may be possible to transmit and receive control signals.

In accordance with the present invention, it is possible to wash or dry a large amount of laundry through the main laundry treating device, while washing or drying a small amount of laundry through the auxiliary laundry treating device. Accordingly, it is possible to achieve a convenience in use while saving energy. It is also possible to easily dry laundry including shoes, hats, etc. which are difficult to be dried using a conventional drum type drying machine.

In another aspect of the present invention, a multiple laundry treating machine comprises: a main laundry treating device for performing a washing stroke or a drying stroke; and an auxiliary laundry treating device arranged at one side of the main laundry treating device, the auxiliary laundry treating device including a tub for containing laundry, and performing a washing stroke in the tub under a control of the main laundry treating device.

A controller for controlling the overall operation of the main and auxiliary laundry treating devices may be provided at the main laundry treating device.

A key input unit for inputting a user command for the main and auxiliary laundry treating devices may be provided at the main laundry treating device, together with the controller for controlling the overall operation of the main and auxiliary laundry treating devices.

A display unit for displaying the user command input from the key input unit or a stroke state under a control of the controller may be provided at the main laundry treating device, together with the controller for controlling the overall operation of the main and auxiliary laundry treating devices and the key input unit for inputting a user command for the main and auxiliary laundry treating devices.

Advantageous Effects

In accordance with the present invention, it is possible to achieve a convenience in use and to save energy by the provision of an auxiliary drying device or an auxiliary washing device capable of treating a small amount of laundry without driving a laundry treating device having a relatively-large capacity.

It is also possible to easily add a drying function to a washing machine only having a washing function.

Also, it is possible to easily dry laundry including shoes, hats, etc. which are difficult to be dried using a conventional drum type drying machine. It is also possible to utilize an auxiliary space in a conventional laundry treating machine, for example, a pedestal, as an auxiliary laundry treating device.

Thus, in accordance with the present invention, it is possible to provide an inexpensive multiple laundry treating machine achieving a maximal use of space, and thus a convenience in use.

In accordance with the present invention, washing and drying operations can be simultaneously carried out in one multiple laundry treating machine. Also, two different drying methods may be simultaneously carried out for different kinds of laundry. Accordingly, there are effects of achieving a convenience in use and saving of time.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 1 is a perspective view illustrating a conventional laundry treating machine including a pedestal;

FIG. 2 is a perspective view illustrating a multiple laundry treating machine according to the present invention;

FIG. 3 is an exploded perspective view of an auxiliary laundry treating machine shown in FIG. 2;

FIG. 4 is a sectional view simply illustrating the multiple laundry treating machine according to the present invention;

FIG. 5 is a block diagram illustrating a first embodiment of the operation control type for the auxiliary laundry treating device according to the present invention;

FIG. 6 is a block diagram illustrating a second embodiment of the operation control type for the auxiliary laundry treating device according to the present invention;

FIG. 7 is a block diagram illustrating a third embodiment of the operation control type for the auxiliary laundry treating device according to the present invention;

FIG. 8 is a block diagram illustrating a further embodiment of the operation control type for the auxiliary laundry treating device according to the present invention;

FIG. 9 is a block diagram illustrating a fifth embodiment of the operation control type for the auxiliary laundry treating device according to the present invention;

FIG. 10 is a sectional view illustrating an embodiment of the line connection between main and auxiliary laundry treating devices in the multiple laundry treating machine according to the present invention;

FIG. 11 is a sectional view illustrating a multiple laundry treating machine according to another embodiment of the present invention;

FIG. 12 is a block diagram illustrating an embodiment of the operation control type for the auxiliary laundry treating device shown in FIG. 11;

FIG. 13 is a block diagram illustrating another embodiment of the operation control type for the auxiliary laundry treating device shown in FIG. 11; and FIG. 14 is a block diagram illustrating another embodiment of the operation control type for the auxiliary laundry treating device shown in FIG. 11

BEST MODE FOR CARRYING OUT THE INVENTION

The present invention now will be described more fully hereinafter with reference to the accompanying drawings, in which preferred embodiments of the invention are shown. In a multiple laundry treating machine according to the present invention, a main laundry treating device thereof may be a general washing machine, a general drying machine, or a general washing/drying machine. Accordingly, no detailed description of the main laundry treating device will be given.

Hereinafter, a multiple laundry treating machine according to an exemplary embodiment of the present invention will be described in detail with reference to FIGS. 2 and 3.

The multiple laundry treating machine 100 according to the illustrated embodiment of the present invention includes a main laundry treating device 110 and an auxiliary laundry treating device 120. Although an auxiliary drying device is used for the auxiliary laundry treating device 120 in the illustrated embodiment, the auxiliary laundry treating device 120 is not limited thereto. An auxiliary washing device may be used for the auxiliary laundry treating device 120.

The multiple laundry treating machine 100 of the present invention includes a pedestal not only functioning as a simple pedestal, but also functioning as the auxiliary laundry treating device 120, different from conventional pedestals. The pedestal of the multiple laundry treating machine 100 is also different from the conventional pedestals in that a coupler 130 is mounted to the pedestal, to stably couple the auxiliary laundry treating device 120 to the main laundry treating device 110.

In accordance with the present invention, the auxiliary laundry treating device 120 is arranged at one side of the main laundry treating device 110, as shown in FIG. 2. For example, the auxiliary laundry treating device 120 may be arranged beneath the main laundry treating device 110, as show in FIG. 2. Alternatively, the auxiliary laundry treating device 120 may be arranged over the main laundry treating device 110. In the latter case, a controller for the laundry treating machine, in particular, a control panel 111, may be arranged at a front surface of the main laundry treating device 110.

The auxiliary laundry treating device 120 may be arranged at one side of the main laundry treating device 110. However, it is preferred that the auxiliary laundry treating device 120 is arranged over or beneath the main laundry treating device 110, taking into consideration utilization of space and design.

As shown in FIGS. 2 and 3, the auxiliary laundry treating device 120 is defined therein with a laundry container in accordance with the present invention. The multiple laundry treating machine also includes the coupler 130 as described above. The main laundry treating device 110 and auxiliary laundry treating device 120 are coupled by the coupler 130. The auxiliary laundry treating device 120 supports the main laundry treating device 110 on a floor.

The multiple laundry treating machine may further include leg supporters 125 provided at the top of the auxiliary laundry treating device 120, to support side surfaces of lower legs 116 and 117 mounted to the bottom of the main laundry treating device 110.

Each leg supporter 125 comprises a panel formed with a first seating hole 126 for providing a seat for one leg 116 included in the main laundry treating device 110, in the case in which the main laundry treating device 110 is a washing machine, and a second seating hole 127 for providing a seat for one leg 117 included in the main laundry treating device 110, in the case in which the main laundry treating device 110 is a drying machine. Each leg supporter 125 is mounted to the top of the auxiliary laundry treating device 120 by means of screws. Here, the washing machine and drying machine are examples of laundry treating machines, in which the outer size of the washing machine is larger than that of the drying machine.

The leg supporters 125 are fixed to respective corners of the top of the auxiliary laundry treating device 120. In each of the leg supporters 125 fixed to the front corners of the auxiliary laundry treating device 120, the first and second seating holes 126 and 127 are connected to each other. On the other hand, in each of the leg supporters 125 fixed to the rear corners of the auxiliary laundry treating device 120, the first and second seating holes 126 and 127 are separated from each other. In accordance with these structures, it is possible to easily achieve the seating of the legs 116 for the washing/drying machine.

Accordingly, the position of the main laundry treating device 110 with respect to the auxiliary laundry treating device 120 is automatically determined, simultaneously with the seating of the leg supporters 125 on the seats of the first seating holes 126 or second seating holes 127.

In each leg supporter 125, the first seating hole 126 is arranged outside the second seating hole 127 along a diagonal line on the bottom of the main laundry treating device 110. This is because, typically, the washing machine is larger than the drying machine.

The coupler 130 includes coupling members 138 each mounted to both the lower portion of a side surface of the main laundry treating device 110, which may be a washing machine or drying machine, and the upper portion of a side surface of the auxiliary laundry treating device 120, and fixing members 135 for fixing each coupling member 138 to both the associated side surface of the main laundry treating device 110 and the associated side surface of the auxiliary laundry treating device 120.

As shown in FIG. 3, the coupler 130 may include at least two coupling members 138 each coupling the adjacent side surfaces of the auxiliary laundry treating device 120 and main laundry treating device 110, each of which has a hexahedral shape.

In addition to the above-described configuration, the coupler 130 may further include a third coupling member (not shown) for coupling the rear surfaces of the auxiliary laundry treating device 120 and main laundry treating device 110.

The coupler 130 may be configured to cope with a variation in the height of the washing machine legs 116 or drying machine legs 117.

Each fixing member 135 includes a first fixing member 136 for fixing an upper portion of the associated coupling member 138 to a lower portion of the side surface of the main laundry treating device 110, namely, the washing machine or drying machine, to which the coupling member 138 is mounted, and a second fixing member 137 for fixing a lower portion of the coupling member 138 to an upper portion of the side surface of the auxiliary laundry treating device 120, namely, the pedestal, to which the coupling member 138 is mounted.

At least one of the first and second fixing members 136 and 137 may comprise a member coated, at opposite surfaces thereof, with an adhesive material, for example, a double-sided tape.

Alternatively, at least one of the first and second fixing members 136 and 137 may comprise a fastener such as a screw. Where screws are used for each fixing member 135, the associated coupling member 138 preferably has fastening holes formed thrash the upper portion of the coupling member 138 while being spaced apart from each other by a certain distance.

Of course, the coupler for coupling the main laundry treating device 110 and auxiliary laundry treating device 120 may have various configurations different from the above-described configuration.

In the present invention, it is preferred that the volume of the auxiliary laundry treating device 120 be smaller than the volume of the main laundry treating device 110, to which the auxiliary laundry treating device 120 is coupled. It is also preferred that the height of the auxiliary laundry treating device 120 be shorter than the height of the main laundry treating device 110. This is because the auxiliary laundry treating device 120 is adapted to perform auxiliary functions for the main laundry treating device 110 in the present invention.

Where the auxiliary laundry treating device 120 functions as a pedestal for the main laundry treating device 110, it is preferred that at least one of the lateral and longitudinal widths of the auxiliary laundry treating device 120 be equal to or longer than that of the main laundry treating device 110, taking into consideration the stability and appearance design of the multiple laundry treating machine 100. However, where the auxiliary laundry treating device 120 is coupled to the top of the main laundry treating device 110, it is preferred that at least one of the lateral and longitudinal widths of the auxiliary laundry treating device 120 be equal to or shorter than that of the main laundry treating device 110.

Hereinafter, the configuration of the auxiliary laundry treating device of the present invention will be described in detail with reference to FIG. 4.

FIG. 4 is a sectional view simply illustrating the configuration of the auxiliary laundry treating device of the present invention.

In accordance with the present invention, the auxiliary laundry treating device 120, namely, the auxiliary drying device, is coupled to the main laundry treating device 110, to form one multiple laundry treating machine 100. In this case, the main laundry treating device 110 receives laundry therein, and performs a washing or drying operation for the laundry. That is, the main laundry treating device 110 may be a general washing machine or a washing machine having a drying function.

The multiple laundry treating machine 100 includes a coupler 130 for coupling the auxiliary laundry treating device 120 to one side of the main laundry treating device 110. The configuration of the coupler 130 is illustrated in FIG. 3.

The auxiliary laundry treating device 120 includes a laundry container defined in the interior of the auxiliary laundry treating device 120 in the form of a space to contain laundry therein, in order to perform auxiliary functions associated with laundry treatment. Although the laundry container may have various shapes, it is preferred that the laundry container have the form of a drawer 121, which is forwardly drawable at the front side of the auxiliary laundry treating device 120. Of course, the laundry container is not limited to the form of the drawer 121. For the convenience of the description, however, the following description will be given in conjunction with the case, in which the laundry container is the drawer 121.

The auxiliary laundry treating device 120 includes a driver, which may be of various types, to dry or refresh laundry, shoes, etc. contained in the laundry container 121.

The driver includes an air supplier 140 for forcibly supplying air to the laundry container 121.

The driver also includes a steam supplier 150 for supplying steam to the laundry container 121. The steam supplier 150 includes nozzles (not shown), to spray steam into the laundry container 121 from the top or rear side of the auxiliary laundry treating device 120.

The air supplier 140 includes a blowing fan 141 for blowing air, and a heater 142 for heating air. As the blowing fan 141 operates, ambient air is introduced into the laundry container, namely, the drawer 121, and is then outwardly discharged cut of the drawer 121. The ambient air is introduced into the drawer 121 after being heated by the heater 142.

The heater 142 may be of various types, for example, an electric type or a gas type. Taking into consideration the installation space of the auxiliary laundry treating device 120, it is preferred that the heater 142 be of an electric type.

Thus, the auxiliary laundry treating device 120 according to the present invention can perform a drying function through the air supplier 140. It is preferred that the heater 142 be a capacity-variable heater capable of varying the temperature of air heated by the heater. This is because specific clothes exhibit a low resistance to heat, and in particular, shoes made of a rubber material exhibit a low resistance to heat.

The driver may include at least one of a temperature sensor for sensing the internal temperature of the laundry container 121 and a humidity sensor for sensing the internal humidity of the laundry container 121. Accordingly, it is possible to appropriately control the drying time or the temperature of supplied air by sensing the internal temperature or humidity of the laundry container 121.

The steam supplier 150 supplies steam to the interior of the laundry container 121. The supplied steam comes into contact with laundry contained in the laundry container 121, and thus performs sterilization of the laundry and removal of creases, odor, etc. from the laundry. Thus, the auxiliary laundry treating device 120 performs a refresh function through the steam supplier 150. Of course, the above-described drying function is carried out, together with the refresh function.

Meanwhile, it is preferred that inlets 171 be formed at an upper portion of the rear wall of the auxiliary laundry treating device 120, to introduce air into the auxiliary laundry treating device 120. Also, it is preferred that outlets 172 be formed at a lower portion of the rear wall of the auxiliary laundry treating device 120, to outwardly discharge air from the auxiliary laundry treating device 120. The rear wall of the laundry container 121 communicates, at an upper portion thereof, with the inlets 171. The rear wall of the laundry container 121 also communicates, at a lower portion thereof, with the outlets 172. Accordingly, ambient air is introduced into the interior of the laundry container 121 via the upper rear wall portion of the auxiliary laundry treating device 120 and the upper rear wall portion of the laundry container 121, and is then discharged from the interior of the laundry container 121 via the lower rear wall portion of the laundry container 121 and the lower rear wall portion of the auxiliary laundry treating device 120.

The blowing fan 141, which functions to generate a flow of air, and the heater 142, which heats air, may be arranged between the rear wall of the laundry container 121 and the rear wall of the auxiliary laundry treating device 120. However, the arrangement of these elements is not limited to the above-described arrangement. The air supplier 140, which includes the blowing fan 141 and heater 142 as described above, may be arranged at any position in a path, along which air is introduced or discharged. Although not shown in FIG. 4, it is preferred that the spaces, where the blowing fan 141 and heater 142 are arranged, respectively, be partitioned from each other.

FIG. 4 illustrates an arrangement in which air is introduced through the upper portion of the laundry container 121, and is discharged through the lower portion of the laundry container 121. However, it may be possible to implement an arrangement in which air is introduced through the lower portion of the laundry container 121, and is discharged through the upper portion of the laundry container 121.

Meanwhile, a rack 160 may be arranged in the laundry container 121 such that the interior of the laundry container 121 is partitioned into upper and lower spaces by the rack 160, as shown in FIG. 4. The upper and lower spaces communicate with each other through the rack 160. Laundry 162 may be laid on the rack 160. The rack 160 functions to allow air supplied to the laundry 162 to be smoothly discharged.

It is preferred that a plurality of thrash holes 160a be formed through the rack 160. In this case, air present in the upper portion of the laundry container 121 can be introduced into the lower portion of the laundry container 121 through the through holes 160a.

The rack 160 may be inclinedly arranged. In this case, it is preferred that the rack 160 be downwardly inclined toward a position where air is introduced. In this case, accordingly, be uniformly supplied to the laundry laid on the rack 160.

Preferably, an air Side 161 is provided at the upper rear wall portion of the laundry container 121. The air Side 161 not only functions to allow air to smoothly reach the front side of the laundry container 121, but also functions to partition the flow paths of introduction air and discharge air. Accordingly, it is possible to minimize the interference between the introduction air and discharge air, and thus to achieve an enhancement in the operation efficiency, for example, the drying efficiency.

As shown in FIG. 4, the auxiliary laundry treating device 120 may include a control panel 123 separate from the control panel 111 of the main laundry treating device 110. The control panel 123 may include a controller for controlling the operation of the auxiliary laundry treating device 120, an operating unit for operating the auxiliary laundry treating device 120 in accordance with a user's selection, and a display unit for displaying an operation state of the auxiliary laundry treating device 120, a communication unit for performing wired or wireless communications with the main laundry treating device 110. Of course, the control panel 123 may include only one of the above-described units. Also, the control panel 123 itself may be dispensed with, as will be described later.

The multiple laundry treating machine 100 according to the present invention may be controlled in various types.

Hereinafter, the operation control type of the multiple laundry treating machine 100 according to the present invention, in particular, the operation control type for the auxiliary laundry treating device 120, will be described with reference to FIGS. 5 to 9.

Since the main laundry treating device 110 of the multiple laundry treating machine 100 can be controlled in a conventional operation control type, no description will be given of the operation control type for the main laundry treating device 110.

First, an exemplary embodiment of the operation control type for the auxiliary laundry treating device 120 in the multiple laundry treating machine 100 according to the present invention will be described with reference to FIG. 5.

In the illustrated embodiment, the operation of the auxiliary laundry treating device 120 is controlled by the controller 200 included in the main laundry treating device 110. That is, the operation of the driver in the auxiliary laundry treating device 120 is controlled by the controller 200. In this case, the controller 200 may be a controller for controlling the operation of the main laundry treating device 110, as in conventional cases. Alternatively, the controller 200 may be a controller separate from the controller of the main laundry treating device 110. The controller 200 and the driver of the auxiliary laundry treating device 120, for example, the air supplier 140, steam supplier 150, and sensor 180, are connected in a wired or wireless manner such that a control signal can be transmitted from the controller 200 to the driver.

Meanwhile, the controller 200 may be provided at the control panel 111 of the main laundry treating device 110.

Hereinafter, another embodiment of the operation control type for the auxiliary laundry treating device 120 according to the present invention will be described with reference to FIG. 6.

In accordance with this embodiment, an operating unit 210, which operates the auxiliary laundry treating device 120 in accordance with a user's selection, is provided at the main laundry treating device 110, as shown in FIG. 6. The user operates the operating unit 210, to select a desired operation mode of the auxiliary laundry treating device 120. In accordance with the operation mode selected thrash the operating unit 210, the controller 200 appropriately controls the driver of the auxiliary laundry treating device 120. In this case, the operating unit 210 may be arranged at the control panel 111.

Another embodiment of the operation control type for the auxiliary laundry treating device 120 according to the present invention will be described with reference to FIG. 7.

In accordance with this embodiment, a display unit 220 for displaying the operation state of the auxiliary laundry treating device 120 is provided at the main laundry treating device 110, as shown in FIG. 7. The user can easily check, through the display unit 220, whether or not the auxiliary laundry treating device 120 operates, or a residual drying time. The display unit 220 may be a display unit for the main laundry treating device 110, as in conventional cases. In this case, information as to whether or not the main laundry treating device 110 operates and information as to whether or not the auxiliary laundry treating device 120 operates may be displayed in a sequential manner. The display unit 220 may be arranged at the control panel 111.

Another embodiment of the operation control type for the auxiliary laundry treating device 120 according to the present invention will be described with reference to FIG. 8.

In accordance with this embodiment, an operating unit 215, which operates the auxiliary laundry treating device 120 in accordance with a user's selection, is provided at the auxiliary laundry treating device 120, as shown in FIG. 8. On the other hand, a display unit 220, which displays the operation state of the auxiliary laundry treating device 120, is provided at the main laundry treating device 110. Of course, the operation of the driver of the auxiliary laundry treating device 120 is controlled by the controller 200 included in the main laundry treating device 110.

In this case, a large number of control lines may be required to transmit control signals between the controller 200 and the driver and to transmit operation signals generated through the operating unit 215 to the controller 200. In order to solve this problem, it is preferred that communication units 230 and 235 be provided at the main laundry treating device 110 and auxiliary laundry treating device 120, respectively. The communication units 230 and 235 may be implemented in the form of communication ICs. Also, the communication units 230 and 235 may be implemented in a wired or wireless manner. Since wireless communication units can be easily implemented, using light emitters and light receivers, by a skilled person in the technical field, no description thereof will be given.

Another embodiment of the operation control type for the auxiliary laundry treating device 120 according to the present invention will be described with reference to FIG. 9.

In accordance with this embodiment, both an operating unit 215, which operates the auxiliary laundry treating device 120 in accordance with a user's selection, and a display unit 225, which displays the operation state of the auxiliary laundry treating device 120, are provided at the auxiliary laundry treating device 120, as shown in FIG. 9. Of course, the operation of the driver of the auxiliary laundry treating device 120 is controlled by the controller 200 included in the main laundry treating device 110.

In this case, a large number of control lines may be required to transmit control signals between the controller 200 and the driver and between the controller 200 and the display unit 225, and to transmit operation signals generated through the operating unit 215 to the controller 200. In order to solve this problem, it is preferred that communication units 230 and 235 be provided at the main laundry treating device 110 and auxiliary laundry treating device 120, respectively. The communication units 230 and 235 may be implemented in the form of communication ICs. Also, the communication units 230 and 235 may be implemented in a wired or wireless manner.

Meanwhile, where control lines or communication lines for transmission of control or communication signals are connected between the main laundry treating device 110 and the auxiliary laundry treating device 120 in a wired manner, in the above-described embodiments, it is preferred that the control lines or communication lines have the form of harnesses. The harnesses may be easily connected throb connectors.

Hereinafter, the coupling, in particular, the line connection for transmission of control or communication signals, between the main laundry treating device 110 and the auxiliary laundry treating device 120 in the multiple laundry treating machine 100 according to the present invention will be described in detail with reference to FIG. 10.

As described above, the main laundry treating device 110 and auxiliary laundry treating device 120 may not have structures independent from each other. That is, the main laundry treating device 110 and auxiliary laundry treating device 120 may be required to be connected by lines for transmission of control and communication signals therebetween. In this case, line connections are formed between the main laundry treating device 110 and auxiliary laundry treating device 120. For such line connections, a connecting unit 300 is provided.

The connecting unit 300 should be insulated because electricity flows through the connecting unit 300. Furthermore, the connecting unit 300 should secure an easy line connection and a reliability of the line connection.

As shown in FIG. 10, the connecting unit 300 includes a connector 301 provided at the bottom of the main laundry treating device 110, and a connector 302 provided at the top of the auxiliary laundry treating device 120. To the connectors 301 and 302, lines for transmission of communication signals, control signals, etc. are connected in the form of harnesses (not shown).

In addition to the connectors 301 and 302, the connector 300 includes insulators 310 and 311 for electrical insulation. The insulators 310 and 311 are formed around the connectors 301 and 302, respectively, to perform an insulating function in a state in which the connectors 301 and 302 are connected. The insulator 310 and 311 are made of an insulating material, preferably, a material elastically compressible to a certain degree, such as rubber.

Each connector 301 or 302 and the associated insulator 310 or 311 may be integrally formed. Only one of the insulators 310 and 311 may be formed around the associated connector 301 or 302.

As described above, the position of the main laundry treating device 110 with respect to the auxiliary laundry treating device 120 can be automatically determined by the legs 116 of the main laundry treating device 110 and the leg supporters 125. In this regard, it is preferred that the connection between the connectors 301 and 302 be achieved, simultaneously with the automatic position determination. Also, the main laundry treating device 110 and auxiliary laundry treating device 120 are coupled by the coupler 130, as described above. Thus, the connection between the connectors 301 and 302 and the reliability of the connection will be secured by the coupler 130.

Hereinafter, the operation of the multiple laundry treating machine 100, in particular, the auxiliary laundry treating device 120, will be described in detail. The operation of the auxiliary laundry treating device 120 may be carried cut, simultaneously with or independently of the operation of the main laundry treating device 110.

First, the user draws the laundry container 121, and then lays laundry 162, which may be a small amount of clothes, shoes, or hats, on the rack 160. When the laundry 162 is clothes, it is desirable to spread the cloths on the rack 160.

Thereafter, the user selects a desired operation mode in accordance with the kind of the laundry, through the operating unit 210 or 215. The operation mode may include various drying modes and are fresh mode.

The drying modes may be divided in accordance with a drying time and a drying temperature. The drying time and drying temperature may be determined in accordance with the kind of laundry. For example, when it is desired to dry a small amount of clothes made of cotton, a drying mode having a short drying time and a high drying temperature may be set. On the other hand, for shoes, a drying mode having a long drying time and a low drying temperature may be set.

That is, the temperature and supply time of air forcibly supplied to the space, in which laundry is contained, are varied, depending on the operation mode selected by the user.

When the operation mode is the refresh mode, high-temperature steam is supplied to the laundry. Accordingly, refresh of the laundry is carried cut by the steam. That is, removal of odor and creases from the laundry and sterilization of the laundry are achieved. After the completion of the refresh mode, air may be supplied to dry the laundry, if necessary.

The controller 200 controls the driver of the auxiliary laundry treating device 120 to drive appropriately, in accordance with the operation mode selected by the user. Meanwhile, the user can check the operation state of the auxiliary laundry treating device 120, through the display unit 220 or 225.

Meanwhile, in accordance with another embodiment of the present invention, the multiple laundry treating machine 100 may include the main laundry treating device 110 and an auxiliary laundry treating device 400, as shown in FIG. 11. In this case, the auxiliary laundry treating device 400 functions as an auxiliary washing device.

Hereinafter, the configuration of the auxiliary laundry treating device 400 will be described in detail.

As shown in FIG. 11, the auxiliary laundry treating device 400 according to this embodiment includes a case 410. The case 410 includes a case body 430, and a drawer 420 received in the case body 430. The drawer 420 is forwardly drawable from the case body 430.

The case body 430 has an appropriate size and a high structural strength to allow a conventional laundry treating machine to be laid thereon.

An outer tub 440 is installed in and supported by the drawer 420. In order to support the cuter tub 440, supporters 460 are arranged at four corners of the case 410, as shown in FIG. 11.

The supporters 460 may have the same structure as supporters used in a conventional vertical-axis type washing machine to support an cuter tub.

One end of each supporter 460 is connected to the associated corner of an upper frame 421 covering the top of the drawer 420. The other end of each supporter 460 is connected to the peripheral wall of the cater tub 440.

The upper end of the outer tub 440 is connected to the upper frame 421 via a gasket 422 made of a flexible sealing material. The upper frame 421 and gasket 422 function to prevent foreign matter including water from being introduced between the outer tub 440 and the drawer 420.

Since the gasket 422 is flexible, it prevents vibration from the cater tub 440 from being transmitted to the upper frame 421.

An outer tub door 441 is mounted to the upper end of the outer tub 440, at which a top opening is formed. An annular rim 442 is radially inwardly protruded from the inner peripheral wall surface of the outer tub 440. A door seal 444 is attached to the outer tub door 441. When the outer tub door 441 is closed, the door seal 444 comes into contact with the annular rim 442, thereby sealing the upper end of the cater tub 440.

A hook (not shown) is mounted to the cater tub door 441. The hook is engageable with a hook groove formed at the inner peripheral wall surface of the cater tub 440. Preferably, the hook is supported by a spring (not shown) mounted to the cater tub door 441. The hook has a gently-curved tip such that the hook can be engaged with or disengaged from the hook groove when an appropriate force is applied to the door 441 to close or open the door 441.

For such a hook device, it is possible to use a well-known structure mainly used in other appliances, without any design change. Of course, other locking devices may be used in place of the hook device.

Since the auxiliary laundry treating device 400 has a relatively-low height, wash water may overflow the outer tub 440. However, this phenomenon can be prevented by the cater tub door 441.

An inner tub 450 is arranged in the outer tub 440. A plurality of through holes are formed through the inner tub 450, in order to allow water to be introduced into or discharged alt of the inner tub 450.

A motor 490 is fixedly mounted to the bottom of the outer tub 440 beneath the outer tub 440. The motor 490 is of an cuter rotor type. Accordingly, the stator of the motor 490 is fixed to the bottom of the cuter tub 440 beneath the cuter tub 440. The rotor of the motor 490 includes a rotating shaft 491 extending through the bottom of the cuter tub 440 such that it is directly connected to the bottom of the inner tub 450.

A bearing is mounted on the bottom of the cuter tub 440, to support the rotating shaft 491.

The motor 490 has a concentrated winding structure, so that the diameter thereof is large, as compared to the height thereof.

A draining tube 470 is connected to the bottom of the cuter tub 440, to drain water. One end of the draining tube 470 is fixed to the case body 430, and is open to the outside of the auxiliary laundry treating device 400. The other end of the draining tube 470 is connected to the bottom of the cuter tub 440 such that it is open to the interior of the cuter tub 440. A draining pump 472 is connected to the draining tube 470.

A portion of the draining tube 470 comprises a bellows tube 471 extendable and contractable in a longitudinal direction. The bellows tube 471 is extended when the drawer 420 is forwardly drawn.

A telescopic structure may be used in place of the bellows tube structure.

A water supply tube 480 is connected, at one end thereof, to an upper portion of the cuter tub 440, to supply water. The other end of the water supply tube 480 is connected to a water supply valve 482. Similarly to the draining tube 470, a portion of the water supply tube 480 comprises a bellows tube 481.

A steam generator 485 is also installed in the auxiliary laundry treating device 400, to supply steam to the interior of the cuter tub 440. The steam generator 485 includes a water supply tube 486 connected to the water supply valve 482, to receive water supplied through the water supply valve 482. The steam from the steam generator 485 is supplied to the interior of the cuter tub 440 via a steam tube 487.

The steam tube has a structure variable in length, like a bellows tube.

The steam tube 487 has a steam nozzle arranged at the top of the inner tub 450, to supply steam to the interior of the inner tub 450.

The above-described steam generator 485 may have the same structure as a steam generator used in conventional washing machines.

Preferably, the steam generator 485 is arranged at one top corner of the case 410.

A connector 300 is also provided for communications between the main laundry treating device 110 and the auxiliary laundry treating device 400. Since the structure of the connector 300 is identical to that of the above-described embodiment, no description thereof will be given.

Meanwhile, the auxiliary laundry treating device 400 may include a control panel 423 separate from the control panel 111 of the main laundry treating device 110. The control panel 423 may include a controller for controlling the operation of the auxiliary laundry treating device 400, a key input unit for operating the auxiliary laundry treating device 400, a display unit for displaying an operation state of the auxiliary laundry treating device 400, a sound output unit for outputting the operation state of the auxiliary laundry treating device 400 in the form of a sound, and a communication unit 500 for performing communications with the main laundry treating device 110. Of course, the control panel 423 may include only one of the above-described units. Also, the control panel 423 itself may be dispensed with, in accordance with the design thereof.

The main and auxiliary laundry treating devices 110 and 400 include communication modules capable of performing data inputting and outputting in a wired or wireless communication manner, for the communication unit 500, respectively.

The operation of the multiple laundry treating machine according to the present invention can be controlled in various types.

Hereinafter, the operation control for the multiple laundry treating machine according to the present invention will be described with reference to FIGS. 12 to 14. Since the operation control for the main laundry treating device 110 can be achieved in a conventional type, no description thereof will be given.

First, an exemplary embodiment of the operation control type for the auxiliary laundry treating device 400 in the multiple laundry treating machine according to the present invention will be described with reference to FIG. 12.

In this embodiment, the operation of the auxiliary laundry treating device 400 is controlled by a controller 510 included in the main laundry treating device 110. The controller 510 is arranged at the control panel 111 of the main laundry treating device 110.

That is, the operation control for the driver of the auxiliary laundry treating device 400 is achieved thrash the controller 510. The controller 510 is shared between the main and auxiliary laundry treating devices 110 and 400, to control the operations of both the main and auxiliary laundry treating devices 110 and 400.

The data transmission between the controller 510 and the auxiliary laundry treating device 400 is enabled through the wired or wireless communication unit 500.

That is, the driver of the auxiliary laundry treating device 400, for example, a key input unit 530, a sensing unit 540, a washing load 550, a display unit 560, and a sound output unit 570, can perform data transmission with the controller 510 through the communication unit 500. Preferably, the key input unit 530, display unit 560, and sound output unit 570 are arranged at the control panel 423 of the auxiliary laundry treating device 400.

The washing load 550 is a load directly concerning the stroke of the auxiliary laundry treating device 400. The washing load 550 may include the motor 490, steam generator 485, water supply valve 482, draining pump 472, etc. The washing load 550 operates in response to a control signal received from the controller 510.

The sensing unit 540 includes various sensors required in association with the stroke of the auxiliary laundry treating device 400, for example, a water level sensor for sensing the level of wash water in the cuter tub 440, a water temperature sensor for sensing the temperature of the wash water in the outer tub 440, a velocity sensor for sensing the rotating velocity of the motor 490, and a door sensor for sensing opening/closing of the door 441. Information obtained by the sensing unit 540 is transmitted to the controller 510 via the communication unit 500.

The stroke state of the auxiliary laundry treating device 400 is continuously displayed through the display unit 560 after the completion of the stroke or during the stroke, under the control of the controller 510. In a situation such as the completion of the stroke or the generation of an error during the stroke, or other situation to be informed to the user, a corresponding error message or a buzz may be output through the sound output unit 570.

Another embodiment of the operation control type for the auxiliary laundry treating device 400 in the multiple laundry treating machine according to the present invention will be described with reference to FIG. 13.

Similarly to the above-described embodiment, the operation of the auxiliary laundry treating device 400 in this embodiment is controlled by the controller 510 included in the main laundry treating device 110, as shown in FIG. 13. However, a key input unit 530, which operates the auxiliary laundry treating device 400 in accordance with a user's selection, is provided at the main laundry treating device 110.

The controller 510 and key input unit 530 are arranged at the control panel 111 of the main laundry treating device 110.

That is, the operation control for the driver of the auxiliary laundry treating device 400 is achieved through the controller 510. The controller 510 is shared between the main and auxiliary laundry treating devices 110 and 400, to control the operations of both the main and auxiliary laundry treating devices 110 and 400.

The key input unit 530 includes a key panel including keys for operating the main laundry treating device 110, and a key panel including keys for operating the auxiliary laundry treating device 400. That is, the key input unit 530 is configured to be shared between the main and auxiliary laundry treating devices 110 and 400, to operate both the main and auxiliary laundry treating devices 110 and 400.

Similarly to the above-described embodiment, the data transmission between the controller 510 and the auxiliary laundry treating device 400 in this embodiment is enabled through a wired or wireless communication unit 500.

That is, the driver of the auxiliary laundry treating device 400, for example, a sensing unit 540, a washing load 550, a display unit 560, and a sound output unit 570, can perform data transmission with the controller 510 through the communication unit 500. Preferably, the display unit 560 and sound output unit 570 are arranged at the control panel 423 of the auxiliary laundry treating device 400.

The washing load 550 is a load directly concerning the stroke of the auxiliary laundry treating device 400. The washing load 550 may include the motor 490, steam generator 485, water supply valve 482, draining pump 472, etc. The washing load 550 operates in response to a control signal received from the controller 510.

The sensing unit 540 includes various sensors required in association with the stroke of the auxiliary laundry treating device 400, for example, a water level sensor for sensing the level of wash water in the cuter tub 440, a water temperature sensor for sensing the temperature of the wash water in the cuter tub 440, a velocity sensor for sensing the rotating velocity of the motor 490, and a door sensor for sensing opening/closing of the door 441. Information obtained by the sensing unit 540 is transmitted to the controller 510 via the communication unit 500.

The stroke state of the auxiliary laundry treating device 400 is continuously displayed through the display unit 560 after the completion of the stroke or during the stroke, under the control of the controller 510. In a situation such as the completion of the stroke or the generation of an error during the stroke, or other situation to be informed to the user, a corresponding error message or a buzz may be output through the sound output unit 570.

Another embodiment of the operation control type for the auxiliary laundry treating device 400 in the multiple laundry treating machine according to the present invention will be described with reference to FIG. 14.

Similarly to the above-described embodiment, the operation of the auxiliary laundry treating device 400 in this embodiment is controlled by the controller 510 included in the main laundry treating device 110, as shown in FIG. 14.

That is, the operation control for the driver of the auxiliary laundry treating device 400 is achieved through the controller 510. The controller 510 is shared between the main and auxiliary laundry treating devices 110 and 400, to control the operations of both the main and auxiliary laundry treating devices 110 and 400.

In order to enable the control panel 111 to carry out various operations for operating the auxiliary laundry treating device 400 and various monitoring operations, the control panel 111 includes a key input unit 530 for operating the auxiliary laundry treating device 400, a display unit 560 for displaying a stroke state of the auxiliary laundry treating device 400, and a sound output unit 570 for outputting the stroke state of the auxiliary laundry treating device 400 in the form of a sound.

That is, in this embodiment, the control panel 423 of the auxiliary laundry treating device 400 is dispensed with. Instead, the key input unit 530, display unit 560, and sound output unit 570 included in the control panel 111 of the main laundry treating device 110 are also shared to the auxiliary laundry treating device 400 such that they can be used in the auxiliary laundry treating device 400.

The key input unit 530 includes a key panel including keys for operating the main laundry treating device 110, and a key panel including keys for operating the auxiliary laundry treating device 400.

Also, the data transmission between the controller 510 and the auxiliary laundry treating device 400 is enabled through a wired or wireless communication unit 500.

That is, the driver of the auxiliary laundry treating device 400, for example, a sensing unit 540 and a washing load 550, can perform data transmission with the controller 510 through the communication unit 500.

The washing load 550 is a load directly concerning the stroke of the auxiliary laundry treating device 400. The washing load 550 may include the motor 490, steam generator 485, water supply valve 482, draining pump 472, etc. The washing load 550 operates in response to a control signal received from the controller 510.

The sensing unit 540 includes various sensors required in association with the stroke of the auxiliary laundry treating device 400, for example, a water level sensor for sensing the level of wash water in the outer tub 440, a water temperature sensor for sensing the temperature of the wash water in the outer tub 440, a velocity sensor for sensing the rotating velocity of the motor 490, and a door sensor for sensing opening/closing of the door 441. Information obtained by the sensing unit 540 is transmitted to the controller 510 via the communication unit 500.

In this embodiment, the stroke state of the auxiliary laundry treating device 400 is displayed through a display unit 560 included in the control panel 111 of the main laundry treating device 110, after the completion of the stroke or during the stroke, under the control of the controller 510. In a situation such as the completion of the stroke or the generation of an error during the stroke, or other situation to be informed to the user, a corresponding error message or a buzz may be output through the sound output unit 570.

The display of the stroke state of the main laundry treating device 110 and the stroke state of the auxiliary laundry treating device 400 through the display unit 560 may be achieved in accordance with various methods.

For example, when one of the main and auxiliary laundry treating devices 110 and 400 is not in operation, only the stroke state of the laundry treating device, which is in operation, may be displayed.

On the other hand, when both the main and auxiliary laundry treating devices 110 and 400 are in operation, the stroke states of the main and auxiliary laundry treating devices 110 and 400 may be alternately displayed at intervals of a certain time (for example, 5 seconds).

A hot key corresponding to a "display command" may be additionally provided at the key input unit 530, to enable the stroke states of the main and auxiliary laundry treating devices 110 and 400 to be selectively displayed in a toggle manner. For example, it may be possible to display the stroke state of the main laundry treating device 110 in response to a first input, while displaying the stroke state of the auxiliary laundry treating device 400 in response to a subsequent input.

Meanwhile, in a state, in which both the main and auxiliary laundry treating devices 110 and 400 are in operation, and the stroke state of one laundry treating device is displayed, a situation to be preferentially displayed, for example, the completion of the stroke of the other laundry treating device or the generation of an error, may occur. Accordingly, it is preferred that, when such a situation, to be preferentially displayed, occurs, the current display of the stroke state be stopped, and information representing the situation be displayed.

Similarly to the display unit 560, the sound output unit 570 may alternately output signals at intervals of a certain time, or may output signals in accordance with the user's desire. It is also preferred that, when information, to be preferentially displayed, is generated, the sound output unit 570 preferentially output the information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

In accordance with the present invention, it is possible to achieve a convenience in use and to save energy by the provision of an auxiliary drying device or an auxiliary washing device capable of treating a small amount of laundry without driving a laundry treating device having a relatively-large capacity.

It is also possible to easily add a drying function to a washing machine only having a washing function.

Also, it is possible to easily dry laundry including shoes, hats, etc. which are difficult to be dried using a conventional drum type drying machine. It is also possible to utile an auxiliary space in a conventional laundry treating machine, for example, a pedestal, as an auxiliary laundry treating device.

Thus, in accordance with the present invention, it is possible to provide an inexpensive multiple laundry treating machine achieving a maximal use of space, and thus a convenience in use.

In accordance with the present invention, washing and drying operations can be simultaneously carried out in one multiple laundry treating machine. Also, two different drying methods may be simultaneously carried out for different kinds of laundry. Accordingly, there are effects of achieving a convenience in use and saving of time.

The invention claimed is:

1. A multiple laundry treating machine comprising:
   a main laundry treating device for washing or drying laundry contained in an interior of the main laundry treating device;
   an auxiliary laundry treating device attachably and detachably arranged at one side of the main laundry treating device, the auxiliary laundry treating device having a volume and a height respectively smaller than a volume and a height of the main laundry treating device, and having a laundry container formed in an interior of the auxiliary laundry treating device;
   a controller provided at the main laundry treating device, to control an operation of the main laundry treating device and the auxiliary laundry treating device;
   a driver provided at the auxiliary laundry treating device, and controlled by the controller of the main laundry treating device; and
   a connecting unit for connecting the controller of the main laundry treating devices and the driver of the auxiliary laundry treating devices, to enable communication or control operations between the controller of the main laundry treating devices and the driver of the auxiliary laundry treating devices,
   wherein the connecting unit comprises a connector provided under the main laundry treating devices and another connector provided above the auxiliary laundry treating devices, for connecting the controller of the main laundry treating devices and the driver of auxiliary laundry treating devices, wherein the connection by the connector of the main laundry treating devices and the connector of auxiliary laundry treating devices are achieved as the main laundry treating devices and the auxiliary laundry treating devices are coupled, and wherein the main laundry treating devices are seated on the auxiliary laundry treating devices and the connector of the main laundry treating devices and the connector of the auxiliary laundry treating devices are connected.

2. The multiple laundry treating machine according to claim 1, wherein the connecting unit further comprises insulators for insulating the connectors, respectively.

3. The multiple laundry treating machine according to claim 2, wherein the insulators are formed integrally with the connectors, respectively.

4. The multiple laundry treating machine according to claim 1, further comprising:
a coupler for coupling the auxiliary laundry treating device to one side of the main laundry treating device.

5. The multiple laundry treating machine according to claim 1 wherein the driver comprises an air supplier for forcibly supplying air to the laundry container.

6. The multiple laundry treating machine according to claim 1, wherein the driver comprises at least one of a temperature sensor for sensing an internal temperature of the laundry container and a humidity sensor for sensing an internal humidity of the laundry container.

7. The multiple laundry treating machine according to claim 1, wherein the driver further comprises a steam supplier for supplying steam to the laundry container.

8. The multiple laundry treating machine according to claim 1, further comprising:
an operating unit provided at the main laundry treating device, to operate the main laundry treating device and the auxiliary laundry treating device in accordance with a user's selection.

9. The multiple laundry treating machine according to claim 8, further comprising:
a display unit provided at the main laundry treating device, to display an operation state of the main laundry treating device and the auxiliary laundry treating device.

10. The multiple laundry treating machine according to claim 1, further comprising:
an operating unit provided at the auxiliary laundry treating device, to operate the auxiliary laundry treating device in accordance with a user's selection.

11. The multiple laundry treating machine according to claim 10, further comprising:
a display unit provided at the auxiliary laundry treating device, to display an operation state of the auxiliary laundry treating device.

12. The multiple laundry treating machine according to claim 1, wherein the auxiliary laundry treating device is a pedestal for supporting a bottom of the main laundry treating device on a floor.

13. The multiple laundry treating machine according to claim 12, wherein the laundry container has a form of a drawer drawable forwardly.

* * * * *